(12) United States Patent
Logan et al.

(10) Patent No.: US 7,931,241 B2
(45) Date of Patent: *Apr. 26, 2011

(54) METHOD AND APPARATUS FOR SECURING CABLES AND THE LIKE

(76) Inventors: Maurus Logan, Trinton Falls, NJ (US); James J. Daley, Westfield, NJ (US)

(*) Notice: Subject to any disclaimer, the term of this patent is extended or adjusted under 35 U.S.C. 154(b) by 133 days.

This patent is subject to a terminal disclaimer.

(21) Appl. No.: 11/542,077

(22) Filed: Oct. 2, 2006

(65) Prior Publication Data

US 2008/0078889 A1 Apr. 3, 2008

(51) Int. Cl.
*F16L 3/00* (2006.01)

(52) U.S. Cl. .......................................... 248/49; 248/65

(58) Field of Classification Search .................... 248/65, 248/74.1, 74.3, 70, 60; 24/16, 294, 297, 24/293, 295
See application file for complete search history.

(56) References Cited

U.S. PATENT DOCUMENTS

| | | | | |
|---|---|---|---|---|
| 3,632,071 | A | * | 1/1972 | Cameron et al. ............. 248/74.3 |
| 4,269,378 | A | * | 5/1981 | Barry ............................... 248/56 |
| 4,389,754 | A | * | 6/1983 | Sohma ......................... 24/16 PB |
| 4,805,856 | A | * | 2/1989 | Nicoli et al. ................. 248/74.3 |
| 6,149,109 | A | * | 11/2000 | Stankowski ................. 248/74.3 |
| 6,164,603 | A | * | 12/2000 | Kawai .............................. 248/73 |
| 6,364,257 | B1 | * | 4/2002 | Holder ......................... 248/74.3 |
| 6,557,805 | B1 | * | 5/2003 | Snyder ............................ 248/60 |
| 7,185,399 | B2 | * | 3/2007 | Logan ........................... 24/16 R |
| 2008/0208213 | A1 | * | 8/2008 | Benjamin et al. ............ 606/139 |

* cited by examiner

*Primary Examiner* — Amy J Sterling
(74) *Attorney, Agent, or Firm* — James J. Daley

(57) ABSTRACT

A mount for securing a cable tie to a panel having a mounting aperture therethrough of a given expanse, the mount having a cable tie receiving and retaining passage therein, the mount having a relaxed state defining a first mount expanse larger than the given expanse and an unrelaxed state defining a second mount expanse not greater than the given expanse, the mount being insertable into and through the mounting aperture in the unrelaxed state thereof and thereupon assuming the relaxed state thereof and perimetrically closing the mounting aperture.

6 Claims, 5 Drawing Sheets

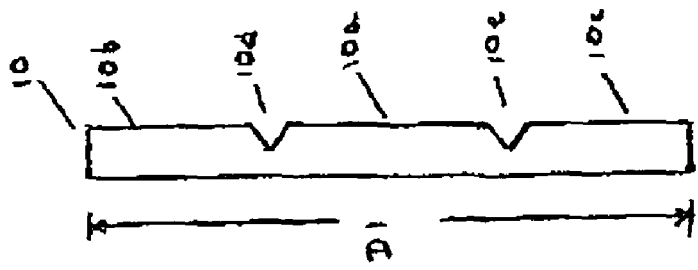
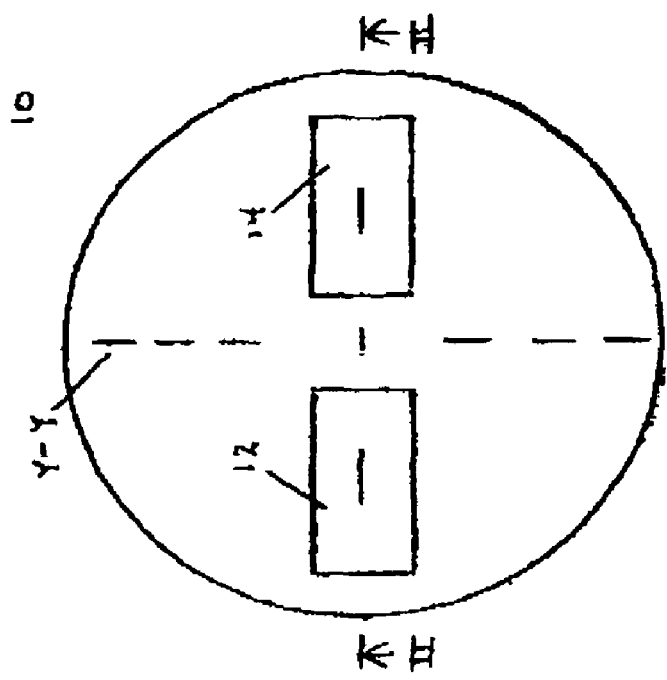
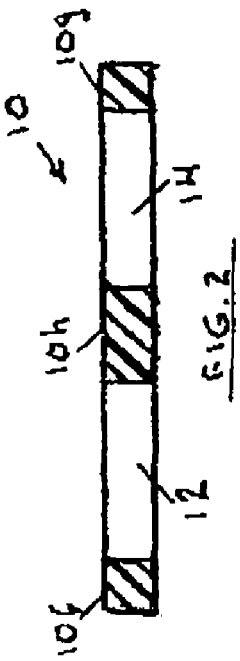
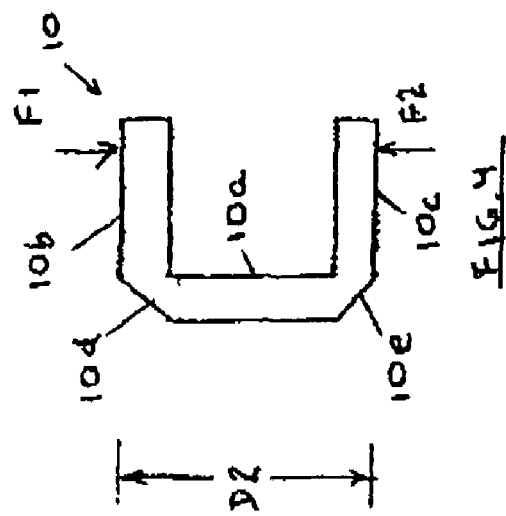

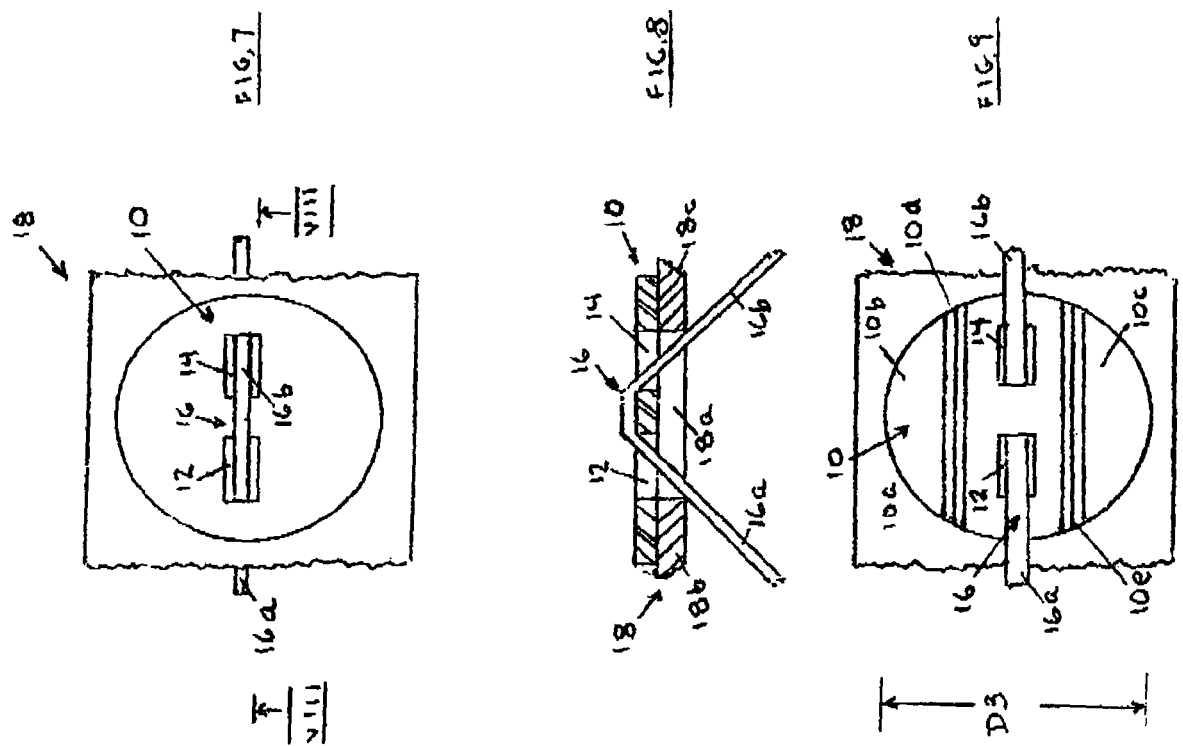

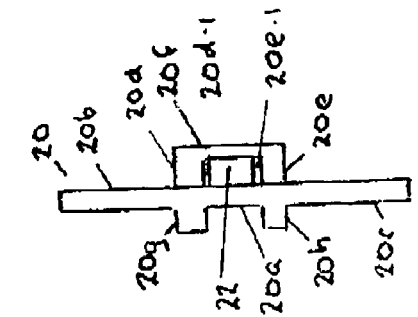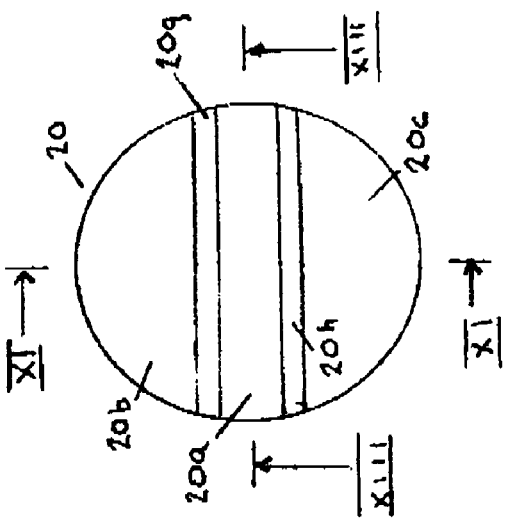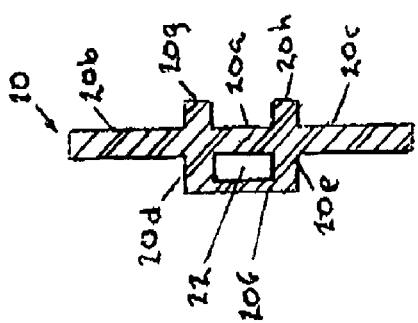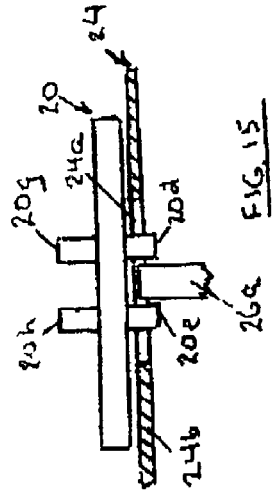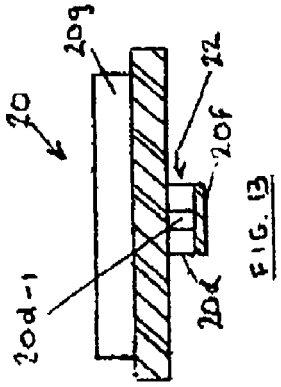

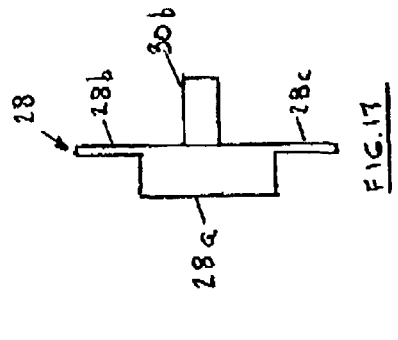
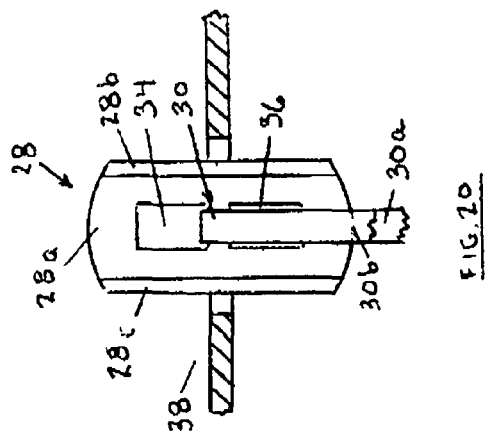
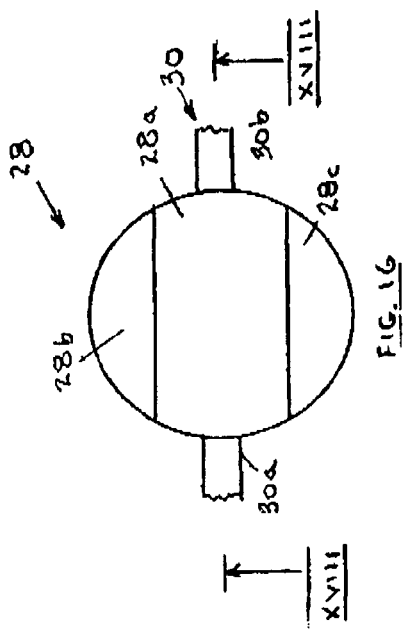
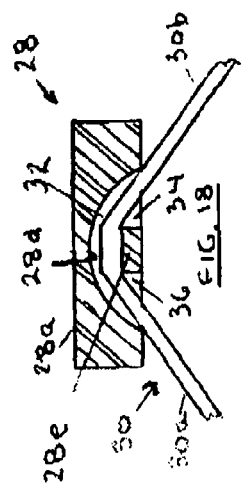
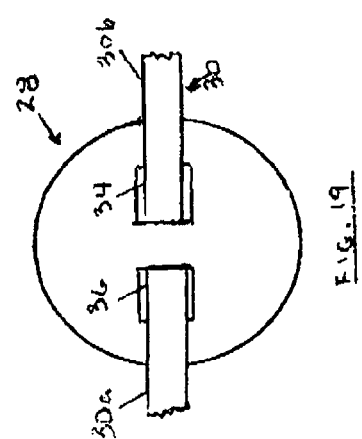

METHOD AND APPARATUS FOR SECURING CABLES AND THE LIKE

FIELD OF THE INVENTION

The present invention relates generally to securement apparatus and methods and pertains more particularly to securement apparatus using so-called "cable ties".

BACKGROUND OF THE INVENTION

For many years, the electrical cable industry has had the benefit of cable ties to encircle and ensnare groupings of conductors. Applicant's U.S. Pat. Nos. 3,022,557 and 3,047,945, now expired, respectively show examples of cable ties and tensioning apparatus for use in assembling cable ties and conductor groupings. As shown in these patents, cable ties are typically molded plastic members having a head portion and a tail portion extending from the head portion to a free end. The head portion typically includes a pawl member extending into a tail portion passage extending fully through the head portion. The tail portion is routed about the conductors to be ensnared and some designs have serrations on one or both outer surfaces thereof designed to pass by the pawl member under the pulling pressure of a person or a pulling tool, the pawl retentively engaging the serrations to form a cable tie loop tightly encircling the conductors. Some designs involve a tail with a smooth surface, which is engaged by a pawl.

Where it is desired to mount a cable tie to a mounting panel, use is sometimes made of a so-called "mounting head tie", such as are available from Thomas & Betts Corporation under the trademark "Catamount". This cable tie is formed as above described, but further includes a mounting head or boss integrally formed with the tie proper adjacent the tie head portion and defining a circular hole. Use of mounting head ties entails need for a stove bolt and nut, a flat washer and a lock washer. The stove bolt is inserted through the mounting head hole and the flat washer and lock washer are then applied to the bolt after the bolt has been inserted through an opening in a mounting panel. The bolt is then threaded into the nut and tightened.

An alternative to the foregoing apparatus is seen in a "Single-Bundle Mounting Base", also available from Thomas & Betts Corporation under the registered trademark "Ty-Rap". This device is an elongate nylon base, having end openings for receiving screws for mounting the base to a mounting panel and further openings intermediate the end openings. The end of a cable tie opposite the head portion is passed successively through the intermediate openings and the mounting screws are then applied to the base and threaded into openings in the mounting panel. Conductors are now applied to the cable tie and the tie is tightened about the conductors.

From applicants' perspective, use of the mounting head tie or the single-bundle mounting base is costly, labor intensive and inefficient in weight sensitive environments, such as aircraft, where lessening of the securement device weight converts into fuel saving, shortened take-off distances and extended flight mileage.

Lessened cost, labor intensity and weight than provided by the mounting apparatus above described is available, e.g., through the use of so-called "Push Mount Cable Ties" also sold by Thomas and Betts Corporation under the aforesaid Catamount trademark. This device includes an arrowed structure adjacent the cable tie head portion and formed integrally therewith. The arrowed structure is inserted into an opening in a mounting panel of specific thickness and the wings of the arrow, upon emerging from the opening, spread apart, securing the cable tie to the mounting panel. From applicant's perspective, such alternative does not provide desired mounting securement strength and requires precise hole diameters and panel thickness.

Another approach to cable tie mounting of lessened labor intensity is seen in O'Grady U.S. Pat. No. 5,314,154, which discloses a cable tie having a head portion and a tail extending from the head portion, the tail having a self-bias to a planar configuration, and a securement member defining a single elongate slot for receiving the cable tie tail. Upon assembly of the securement member and the cable tie tail, the tail is folded upon itself and the securement member rotated into general alignment with the folded cable tie tail. The securement member is inserted into and through a mounting panel opening, whereupon the securement member, which has a length exceeding the diameter of the mounting panel opening, rotates into parallelism with the mounting panel and is urged against the mounting panel by the self-bias of the cable tie tail.

Another approach to cable tie mounting of lessened labor intensity in copending, commonly-assigned patent application Ser. No. 10/772,909, filed on Feb. 5, 2004 and entitled "METHOD AND APPARATUS FOR SECURING CABLES AND THE LIKE", and now standing as allowed and incorporated herein by this reference thereto. In that approach, a method is provided for use in assembling conductors with a mounting panel, comprising the steps of: (a) providing a cable tie having a head and a tail extending from the head, the tail having a self-bias to a planar condition; (b) attaching a securement member to the tail using the self-bias of the tail to render the securement member portable with the cable tie; and (c) attaching the securement member and the cable tie to the mounting panel using the self-bias of the tail.

In its preferred form, the securement member extends longitudinally with the tail and defines (1) first and second perimetrically bounded elongate apertures opening along their lengths into first and second opposed sides of the securement member and (2) a tail support portion longitudinally between the first and second apertures, the tail being deformed by the securement member from the planar configuration to have an arcuate portion facing the support portion of the securement member, first and second courses of the tail extending from the tail arcuate portion respectively through the first and second apertures and movable out of the first and second apertures, the self-bias of the tail biasing the securement member into engagement with the tail such that the securement member and the tail are attached with one another to be jointly portable.

Still another approach along these lines is set forth in copending, commonly-assigned patent application Ser. No. 11/302,182, filed on Dec. 12, 2005 and entitled "METHOD AND APPARATUS FOR SECURING CABLES AND THE LIKE". This approach provides a securement member for mounting a cable tie to a mounting panel, the cable tie being an elongate member having a head and a tail extending from the head, the securement member comprising a rigid elongate body defining an aperture extending therethrough, the aperture being adapted to receive the tail longitudinally of the body and being of lesser dimension than a tail dimension in one of tail width and height to frictionally engage the received tail.

More particularly, in one aspect, the cable tie tail has a given transverse dimension (width) and a given thickness (height), the aperture receiving the tail having a width dimension less than the tail given transverse dimension and a height dimension at least equal to the tail height.

In another aspect, the cable tie tail has a given transverse dimension (width) and a given thickness (height), the aperture receiving the tail having a width at least equal to the transverse dimension of the tail and a height dimension less than the tail thickness.

The securement member aperture may be preformed to have the respective lesser width or height dimensions or may be so formed after the tail receives the tie tail.

In a further aspect, the body defines a further aperture extending therethrough also adapted to receive the tail, the further aperture having a height dimension at least equal to the tail thickness and a dimension transversely of the received tail at least equal to the tail given transverse dimension.

Further, longitudinally outermost margins of the first-mentioned and the further apertures may frictionally engage the received tail.

SUMMARY OF THE INVENTION

A primary object of the present invention is to provide a further simplified apparatus for mounting conductors on a mounting panel.

A more particular object of the present invention is to provide apparatus for mounting conductors on a mounting panel, wherein the apparatus is inexpensive, labor unintensive and efficient in weight sensitive environments.

In attaining the foregoing and other objects, in one aspect, the invention provides a mount for securing a cable tie to a panel having a mounting aperture therethrough of a given expanse, the mount having a cable tie receiving and retaining passage therein, the mount having a relaxed state defining a first mount expanse larger than the given expanse and an unrelaxed state defining a second mount expanse not greater than the given expanse, the mount being insertable into and through the mounting aperture in the unrelaxed state thereof and thereupon assuming the relaxed state thereof and perimetrically closing the mounting aperture.

The mount comprises a body having a central portion and outer portions, the outer portions collectively defining the first mount expanse in the mount relaxed state, wherein the outer portions are deformed relative to the central portion and collectively define the second mount expanse in the mount unrelaxed state. The central portion defines the cable receiving and retaining passage.

The foregoing and other features of the invention will be further understood from the ensuing detailed description of preferred embodiments and practices and from the drawings, wherein like reference numerals identify like components throughout.

DESCRIPTION OF THE DRAWINGS

FIG. 1 is a top plan view of a first embodiment of a cable tie mount in accordance with the invention.

FIG. 2 is a sectional view as would be seen from plane II-II of FIG. 1.

FIG. 3 is a right side elevation of FIG. 1.

FIG. 4 is a left side elevation of FIG. 1 with the outer portions of the mount displaced relative to the mount inner portion.

FIG. 7 is a plan view of the mount as shown in FIG. 5 fully assembled with the mounting panel.

FIG. 8 is a sectional view of FIG. 7 as would be seen from plane VIII-VIII of FIG. 7.

FIG. 9 is a bottom plan view of FIG. 7.

FIG. 10 is a top plan view of a second embodiment of a cable tie mount in accordance with the invention.

FIG. 11 is a sectional view as would be seen from plane XI-XI of FIG. 10.

FIG. 12 is a right side elevation of FIG. 10.

FIG. 13 is a sectional view as would be seen from plane XIII-XIII of FIG. 10.

FIG. 14 shows in section a mounting panel and the mount of FIG. 10 assembled with a cable tie with the mount outer portions folded relative to its inner portion and with the mount partly inserted into the mounting panel.

FIG. 15 is a repeat showing of FIG. 14, however, with the mount fully inserted into the mounting panel.

FIG. 16 is a top plan view of a third embodiment of a cable tie mount in accordance with the invention assembled with a cable tie.

FIG. 17 is a right side elevation of FIG. 16.

FIG. 18 is a sectional view as would be seen from plane XVIII-XVIII of FIG. 16.

FIG. 19 is a bottom plan view of FIG. 16.

FIG. 20 is an elevation of the mount and cable tie assembly of FIG. 16 with the mount outer portions displaced relative to its inner portion and partially inserted into a mounting panel.

DETAILED DESCRIPTION OF THE INVENTION

Figure 5:
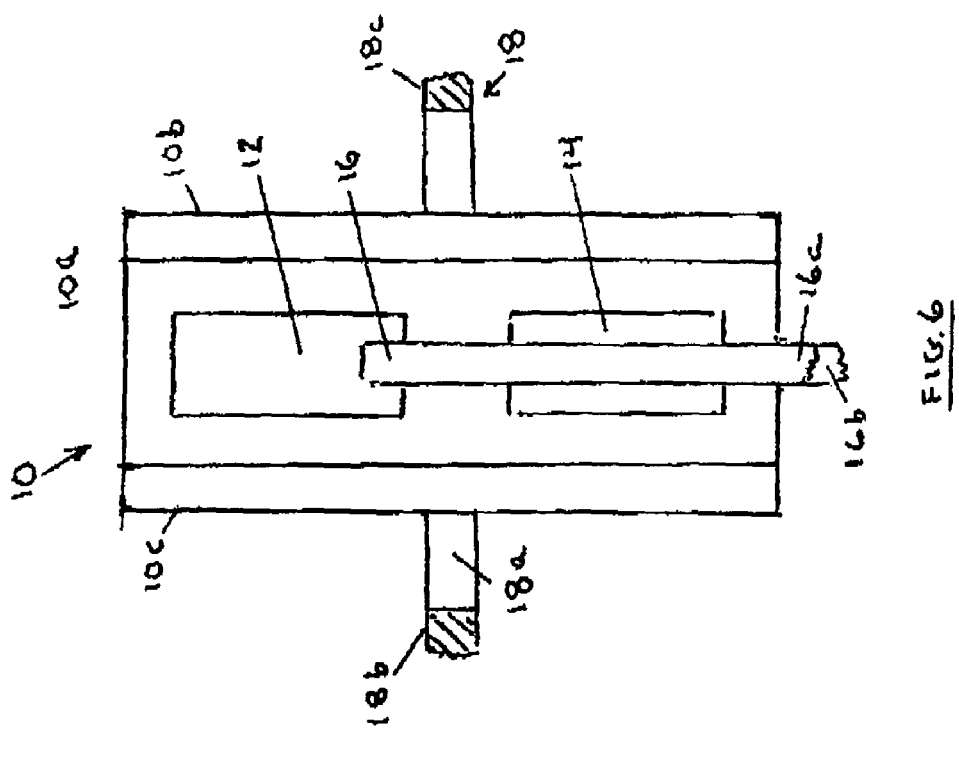
FIG. 5 is an exploded view showing the mount of FIGS. 1-4, assembled with a cable tie and with its outer portions displaced, prior to being inserted into a mounting panel.

Referring to FIGS. 1-3, cable tie mount 10 is a plastic body formed to have a self-bias to a planar configuration and having apertures 12 and 14 extending therethrough and aligned along axis X-X. More specifically, mount 10 has an inner portion 10a, outer portions 10b and 10c and undercuts 10d and 10e.

As is seen in FIG. 4, undercuts 10d and 10e provide definition for outer portions 10b and 10c to be deflected relative to inner portion 10a under the influence of forces F1 and F2 (typically, derived from the thumb and index finger of an installer).

FIG. 5 shows mount 10 assembled with cable tie 16 which is folded to have its tail courses 16a and 16b both extending downwardly. Prior to such folding, the cable tie tail is inserted into and through aperture 12, passed over inner portion 10a and inserted into and through aperture 14. As is discussed fully in incorporated pending '909 application, the longitudinal self-bias of the cable tie tail to a planar configuration gives rise to frictional interengagement of the mount and cable tie tail such that the cable tie is portable with the mount.

FIG. 5 further shows mounting panel 18 with its mounting opening 18a and perimeter 18b-18c bounding opening 18a.

Figure 6:
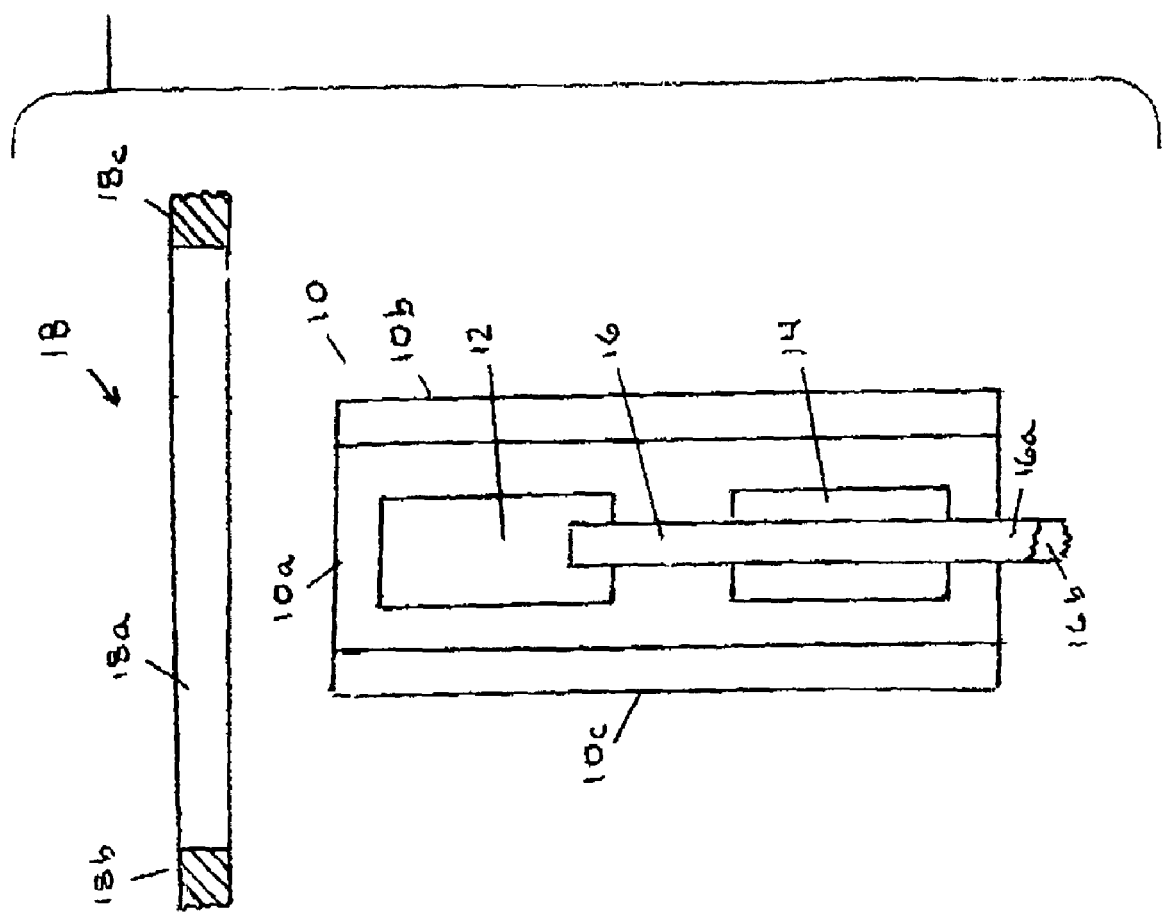
FIG. 6 is a repeat showing of the mount as shown in FIG. 5 partially inserted into the mounting panel.

Turning to FIG. 6, mount 10 with assembled and folded cable tie is shown partly inserted into mounting panel opening 18a.

As is also discussed fully in the '909 application, the mount "toggles" once it has cleared the mounting panel, i.e., is fully inserted therethrough, and the mount's self-bias forces the mount onto the rear (bottom) surface of the mounting panel. This activity also occurs in the present invention. However, since the folded mount outer portions 10b and 10c are now free of deflecting forces, the outer portions resume their coplanar relation with inner portion 10a under the mount's self-bias to assume the disposition thereof shown in FIGS. 7-9, i.e., in closing relation to mounting panel opening 18a.

As will be appreciated, mount 10 is shown in its relaxed state in FIGS. 1-3, i.e., wherein the mount defines an expanse, under the mount's self-bias to a planar configuration, which is greater than the expanse of panel opening 18a. In FIG. 4, mount 10 is shown in its unrelaxed state, brought on by forces F1 and F2, i.e., deformed to define and expanse which is not greater than the expanse of panel opening 18a.

Turning to FIGS. 10-13, second embodiment mount 20 is a plastic body having inner portion 20a and outer portions 20b and 20c with cable tie receptor formed below inner portion 20a by ribs 20d and 20e and floor 20f. Ribs 20g and 20f extend upwardly of mount inner portion 20a.

The cable tie receptor defines cable tie receiving/retaining passage 22. The retention aspect is effected by portions 20d-1 and 20e-1, which are spaced apart across passage 22 by a dimension less than the width of the cable tie. In this embodiment, reliance is placed on the self-bias of the cable tie in its width direction to seek its full width, as is discussed more fully in the referenced '182 application. As is also discussed therein, reliance may also be placed on the self-bias of the cable tie in its thickness direction to seek its full thickness. In this case, portions 20d-1 and 20e-1 would extend into passage 22 from mount inner portion 20a and floor 20f.

FIG. 14 shows mounting panel 24 with opening 24a and periphery 24b-24c and the mount of FIG. 10 assembled with cable tie 26 with the mount outer portions 20b and 20c folded relative to its inner portion 20a and partly inserted into the mounting panel. Cable tie courses 26a and 26b are folded and grasped to insert the mount into the panel opening. FIG. 15 shows the mount fully inserted into the mounting panel and with its portions 20b and 20c resuming coplanar relation with inner portion 20a.

Turning to FIGS. 16-19, mount 28 is a plastic body having inner portion 28a and outer portions 28b and 28c, the latter being of substantially lesser thickness than the former as is seen particularly in FIG. 17. Mount 28 defines a cable tie receiving/retaining passage 32 bounded by arcuate surface 28d and cross-member 28e. Cable tie 30 has courses 30a and 30b resident passage 32 and respectively disposed also in openings 34 and 36 situated aside cross-member 28e. FIG. 20 shows mount 28 partially inserted, following folding of mount outer portions 28b and 28c, into opening 38a of panel 38, bounded by perimeter 38a-38b.

Whereas, in the case of mount 10 of FIG. 1, where cable tie 16 is inserted into opening 34 and then manipulated by an electrician to enter opening 36 to assemble the mount and the cable tie, in the case of mount 28, arcuate surface 28d performs the cable tie manipulation. Further, upon completion of the insertion step and toggling of mount 28, shown in part in FIG. 20, mount 28 provides complete closing of panel opening 38a.

The retention of cable tie 30 in mount 28 is effected, as in the case of mount 10, by force derived from the inherent desire of cable tie 30 to longitudinal planar configuration. Such force further urges the mount against the rear side of mounting panel 38 as in the foregoing embodiments.

By way of summary and partial introduction to the ensuing claims, the invention will be seen to provide, in its mount aspect, a mount for securing a cable tie to a panel having a mounting aperture therethrough of a given expanse, the mount having a cable tie receiving and retaining passage therein, the mount having a relaxed state defining a first mount expanse larger than the given expanse and an unrelaxed state defining a second mount expanse not greater than the given expanse, the mount being insertable into and through the mounting aperture in the unrelaxed state thereof and thereupon assuming the relaxed state thereof and perimetrically closing the mounting aperture.

In its combination aspect, the invention will be seen to provide a cable tie having a head portion and a tail extending from the head portion to a free end and a mount for mounting the cable tie to a mounting panel having a mounting aperture therethrough of a given expanse, the mount having a cable tie receiving and retaining passage therein, the mount having a relaxed state defining a first mount expanse larger than the given expanse and an unrelaxed state defining a second mount expanse not greater than the given expanse, the mount being insertable into and through the mounting aperture in the unrelaxed state thereof and thereupon assuming the relaxed state thereof and perimetrically closing the mounting aperture.

In its method aspect, the invention will be seen to provide a method for mounting a cable tie on a mounting panel having a mounting aperture therethrough of a given expanse, comprising the steps of: (a) providing a mount with a cable tie receiving and retaining passage therein, the mount having a relaxed state defining a first mount expanse larger than the given expanse and an unrelaxed state defining a second mount expanse not greater than the given expanse; (b) assembling the cable tie with the mount; (c) rendering the mount in the unrelaxed state thereof and inserting the mount into and through the mounting aperture in the unrelaxed state thereof; and then (d) rendering the mount in the relaxed state thereof to perimetrically close the mounting aperture.

Various changes may be introduced in the disclosed preferred embodiments and practices without departing from the invention. Accordingly, it is to be appreciated that the true spirit and scope of the invention is set forth in the following claims.

What is claimed is:

1. A mount for securing a cable tie to a panel having a mounting aperture therethrough of a given expanse, said mount having a cable tie receiving and retaining passage therein, said mount having a relaxed state defining a first mount expanse larger than said given expanse and an unrelaxed state defining a second mount expanse not greater than said given expanse, said mount being insertable into and through said mounting aperture in said unrelaxed state thereof and thereupon assuming said relaxed state thereof and perimetrically closing said mounting aperture, said mount comprising a body having a central portion and outer portions, wherein said central portion includes a solid part of said body and first and second openings adjacent opposite ends of said solid part and defining said cable tie receiving and retaining passage.

2. The mount claimed in claim 1, said outer portions collectively defining said first mount expanse in said mount relaxed state.

3. The mount claimed in claim 2, wherein said outer portions are deformed relative to said central portion and collectively defining said second mount expanse in said mount unrelaxed state.

4. The mount claimed in claim 1, including first and second hinge portions connecting said central portion respectively to said outer portions.

5. A mount for securing a cable tie to a panel, said mount having a planar central portion and first and second portions outwardly of said central portion, said first and second portions being disposable in planar alignment with central portion to engage said panel jointly with said central portion when in said planar alignment therewith and being deflectable relative to said central portion to be angularly disposed relative to said central portion to enable said mount to pass through said panel, said central portion defining a cable tie receiving and retaining passage therein.

6. A mount for securing a cable tie to a panel having a mounting aperture therethrough of a given expanse, said mount having a cable tie receiving and retaining passage therein, said mount having a relaxed state defining a first mount expanse larger than said given expanse and an unrelaxed state defining a second mount expanse not greater than said given expanse, said mount being insertable into and through said mounting aperture in said unrelaxed state thereof and thereupon assuming said relaxed state thereof and perimetrically closing said mounting aperture, said mount comprising a body having a central portion and outer portions, said outer portions collectively defining said first mount expanse in said mount relaxed state, wherein said outer portions are deformed relative to said central portion and collectively define said second mount expanse in said mount unrelaxed state, wherein said central portion defines said cable tie receiving and retaining passage, wherein said central portion includes first and second openings extending therethrough in mutual alignment and defining said cable tie receiving and retaining passage.

\* \* \* \* \*